US009714100B2

(12) United States Patent
D'Arbonneau (10) Patent No.: US 9,714,100 B2
(45) Date of Patent: Jul. 25, 2017

(54) METHOD FOR DETECTING A FAILURE OF AT LEAST ONE SENSOR ONBOARD AN AIRCRAFT IMPLEMENTING A BARO-INERTIAL LOOP, AND ASSOCIATED SYSTEM

(71) Applicant: DASSAULT AVIATION, Paris (FR)

(72) Inventor: Francois-Xavier D'Arbonneau, Le Chesnay (FR)

(73) Assignee: DASSAULT AVIATION, Paris (FR)

( * ) Notice: Subject to any disclaimer, the term of this patent is extended or adjusted under 35 U.S.C. 154(b) by 77 days.

(21) Appl. No.: 14/316,459

(22) Filed: Jun. 26, 2014

(65) Prior Publication Data
US 2015/0006020 A1    Jan. 1, 2015

(30) Foreign Application Priority Data
Jun. 28, 2013    (FR) ...................................... 13 01543

(51) Int. Cl.
| | | |
|---|---|---|
| *G01M 17/00* | (2006.01) | |
| *B64F 5/00* | (2017.01) | |
| *G01C 5/00* | (2006.01) | |
| *G01C 5/06* | (2006.01) | |
| *G01C 21/16* | (2006.01) | |
| *G01P 5/14* | (2006.01) | |
| *G01P 7/00* | (2006.01) | |
| *G01P 21/02* | (2006.01) | |
| *G05D 1/04* | (2006.01) | |

(52) U.S. Cl.
CPC ............ *B64F 5/0045* (2013.01); *G01C 5/005* (2013.01); *G01C 5/06* (2013.01); *G01C 21/165* (2013.01); *G01P 5/14* (2013.01); *G01P 7/00* (2013.01); *G01P 21/025* (2013.01); *G05D 1/042* (2013.01)

(58) Field of Classification Search
CPC ..... G01C 5/005; G01C 21/005; G01C 21/165; G01L 7/00; G01P 3/62
USPC ......................................................... 701/7, 4
See application file for complete search history.

(56) References Cited

U.S. PATENT DOCUMENTS

| | | | | |
|---|---|---|---|---|
| 3,364,748 | A | * | 1/1968 | Armstrong ...................... 73/386 |
| 5,349,347 | A | * | 9/1994 | Muller .......................... 340/969 |
| 2003/0233175 | A1 | * | 12/2003 | Giraudy et al. .................. 701/4 |
| 2006/0206267 | A1 | * | 9/2006 | Kirkland et al. ............. 701/220 |

FOREIGN PATENT DOCUMENTS

FR    2 840 073 A1    11/2003

\* cited by examiner

*Primary Examiner* — Redhwan K Mawari
(74) *Attorney, Agent, or Firm* — Davidson, Davidson & Kappel, LLC (57) ABSTRACT

A method for detecting a failure of at least one sensor onboard an aircraft implementing a baro-inertial loop is provided. The method includes implementing a baro-inertial loop including obtaining a computed vertical speed, then a short-term baro-inertial altitude, based on a double integration of the measured vertical acceleration; and developing at least one intermediate loop parameter based on a deviation between the short-term baro-inertial altitude and the pressure altitude. The method also includes observing at least one failure detection parameter obtained from one of the intermediate parameters of the baro-inertial loop; and determining the presence of a failure on one of the sensors of the aircraft based on the value of the observed failure detection parameter.

14 Claims, 7 Drawing Sheets

METHOD FOR DETECTING A FAILURE OF AT LEAST ONE SENSOR ONBOARD AN AIRCRAFT IMPLEMENTING A BARO-INERTIAL LOOP, AND ASSOCIATED SYSTEM

This claims the benefit of French Patent Application FR 13 01543, filed Jun. 28, 2013 and hereby incorporated by reference herein.

The present invention relates to a method for detecting a failure of at least one sensor on board an aircraft including measuring a vertical acceleration, measuring a pressure altitude and implementing a baro-inertial loop in a computer.

Such a method is intended to be implemented in an aircraft, in order to provide failure detection information to the crew of the aircraft.

BACKGROUND

The piloting and guidance of an aircraft, whether manual or automatic, require the provision of precise information on different flight parameters, such as the altitude, airspeed, ground speed, attitude and incline of the aircraft.

The flight parameters are computed from information collected by measuring sensors.

The reliability of the information provided on the flight parameters is critical for proper progression of the flight. In fact, these parameters are used not only directly by the pilot, when the latter takes the controls of the aircraft, but also by the computers intended to control the aircraft automatically, in particular to control the fly-by-wire system, automatic pilots, or automatic guides.

SUMMARY OF THE INVENTION

It is therefore important for the crew of the aircraft to be able to determine any malfunction that may interfere with the computation of the flight parameters as quickly as possible.

One major cause of malfunctions is anomalies from the measuring sensors, which then provide erroneous information to the system.

The main sensors involved in the computation of flight parameters can be divided into two main families.

The first family relates to sensors of the "inertial" type that in particular participate in developing the ground speed. These sensors are typically the inertial units and the satellite positioning systems, such as GPS.

A second family relates to sensors of the "anemometric" type, which in particular participate in developing the airspeed. These sensors are typically probes and pressure sensors, such as static or dynamic pressure sensors, in particular such as Pitot tubes, and temperature sensors.

Incidents and accidents result directly or indirectly from anomalies on the sensors. These anomalies are for example attitude measurement errors, erroneous GPS positions, incorrect total pressure measurements.

Furthermore, the phenomenon of ice accretion of the pressure probes, the measurements of which are used as the basis for many current architectures, is involved in many events.

To detect the presence of any failures on the sensors, it is for example known to compare the data from several redundant sensors and choose the most reliable data by vote.

Alternatively, the physical likelihood of the parameters, with respect to a likely range of values for each parameter, may be used.

Such detection methods have the drawback, however, of not being robust with respect to a shared failure point, for example ice accretion on all of the Pitot tubes, which leads to a set of total pressures that are coherent, likely and valid, but incorrect.

Other methods detect potential blockages by analyzing the pneumatic signal or through devices integrated into the probes. However, not all cases of failures are necessarily well characterized, in particular during ice accretion, such that the anomalies may only be partially detected or not detected at all.

To offset this problem, it is known to compare anemometric parameters with an independent index, of the inertial unit or GPS type. However, this comparison does not allow specific detection of the anomalies on specific sensors or on groups of sensors.

An object of the invention is therefore to have a simple and effective method for detecting anomalies occurring on the vertical path of the aircraft, in particular on the static pressure measurement sensors.

A method for detecting a failure of at least one sensor on board an aircraft is provided. The method includes:
  measuring a vertical acceleration;
  measuring a pressure altitude;
  implementing a baro-inertial loop in a computer, the loop including the following sub-steps:
    obtaining a computed vertical speed, then a short-term baro-inertial altitude, based on a double integration of the measured vertical acceleration;
    developing at least one intermediate loop parameter based on a deviation between the short-term baro-inertial altitude and the pressure altitude;
    looping on the measured vertical acceleration before integration and/or on the vertical speed computed after integration, based on the value of at least one intermediate parameter;
  observing at least one failure detection parameter obtained from one of the intermediate parameters of the baro-inertial loop; and
  determining the presence of a failure on one of the sensors of the aircraft, based on the value of the observed failure detection parameter.

The method according to the invention may comprise one or more of the following features, considered alone or according to any technically possible combination:
  the vertical acceleration is measured by an acceleration sensor;
  the pressure altitude is measured using a pressure sensor;
  the determination step includes a comparison between the value of the observed failure detection parameter and a given predetermined threshold;
  the baro-inertial loop includes computing a first intermediate parameter representative of the difference between the short-term baro-inertial altitude and the pressure altitude, and computing a second intermediate parameter representative of the accumulation of a deviation between the short-term baro-inertial altitude and the pressure altitude over several iterations of the loop;
  the loop includes the determination of an accumulation gain of each deviation between the short-term baro-inertial altitude and the pressure altitude, the second intermediate parameter being computed based on the accumulation gain;
  the accumulation gain is a variable gain, the accumulation gain being computed based on the short-term baro-inertial altitude and/or a vertical speed obtained by integrating the vertical acceleration measured by the vertical acceleration sensor;

a first failure detection parameter is determined from an accumulation of the deviation between the short-term baro-inertial altitude and the pressure altitude over several iterations of the loop, the determination of the first failure detection parameter comprising a decrease in the accumulation, advantageously a reset to zero of the accumulation, when at least one condition for lack of anomaly detection is obtained for a given time interval;

the lack of anomaly detection condition is obtained when the accumulation gain is below a given threshold for a predetermined time interval;

the baro-inertial loop includes the determination of a third intermediate parameter, representative of the deviation between the short-term baro-inertial altitude and the pressure altitude corrected with the second intermediate parameter;

a second failure detection parameter is determined from the third intermediate parameter, while advantageously being equal to the third intermediate parameter;

it includes the simultaneous observation of the first failure detection parameter and the second failure detection parameter, and the detection of the presence of a failure on one of the sensors of the aircraft, based on the value of at least one of the observed failure detection parameters;

the looping step comprises a sub-step for correcting the vertical acceleration before integration, by at least one base correction value depending on the third intermediate parameter and at least one base correction gain variable over time, to obtain the computed vertical speed after integration, the loop comprising a sub-step for correcting the vertical speed computed by at least one second intermediate correction value depending on the third intermediate parameter and at least one intermediate correction gain that is variable over time, to obtain the short-term baro-inertial altitude after integration;

it includes a sub-step of time compensation of the short-term baro-inertial altitude obtained after integration, the intermediate parameter representative of a deviation between the short-term baro-inertial altitude and the pressure altitude being obtained from the difference between the time-compensated short-term baro-inertial altitude, optionally with the application of the compensation gain, and the pressure altitude;

it includes activating an alarm when the presence of a failure is detected in the step for determining the presence of a failure;

the acceleration sensor is included in an inertial unit, the step for measuring a vertical acceleration being carried out by an acceleration sensor of the inertial unit, the computer being included in the inertial unit, the baro-inertial correction loop being implemented in a computer of the inertial unit;

the baro-inertial loop includes determining a long-term baro-inertial altitude, based on at least one of the intermediate loop parameters and of the short-term baro-inertial altitude, the long-term baro-inertial altitude being computed based on the short-term baro-inertial altitude and the second intermediate parameter;

none of the intermediate parameters are sent to a computer of a flight parameter display system in the aircraft, such as a cockpit display, and/or a computer of an automatic control and navigation system of the aircraft, such as automatic pilot.

A system for detecting a failure of least one sensor present on the aircraft is also provided. The system includes:

an assembly for measuring a vertical acceleration;

an assembly for measuring a pressure altitude;

a computer including an assembly for implementing the baro-inertial loop, the implementing assembly comprising:

a module for obtaining a computed vertical speed, then a short-term baro-inertial altitude, based on a double integration of the vertical acceleration obtained from the assembly for measuring a vertical acceleration;

a module for developing at least one intermediate loop parameter based on a deviation between the short-term baro-inertial altitude and the pressure altitude obtained from the assembly for measuring a pressure altitude;

a module for looping on the measured vertical acceleration, before integration, and/or on the vertical acceleration computed after integration, based on the value of at least one intermediate parameter;

an assembly for observing at least one failure detection parameter obtained from at least one of the intermediate parameters of the baro-inertial loop, and an assembly for determining the presence of a failure on one of the sensors of the aircraft, based on the value of the observed failure detection parameter.

The system according to the invention may comprise one or more of the following features, considered alone or according to any technically possible combination:

the assembly for measuring a vertical acceleration includes at least one acceleration sensor;

the assembly for measuring a pressure altitude comprises a pressure sensor;

an inertial unit, the acceleration sensor and the computer being included in the inertial unit;

a module for determining a long-term baro-inertial altitude based on at least one intermediate parameter and on the short-term baro-inertial altitude.

BRIEF SUMMARY OF THE DRAWINGS

The invention will be better understood upon reading the following description, provided solely as an example, and done in reference to the appended drawings, in which.

DETAILED DESCRIPTION

Figure 1:
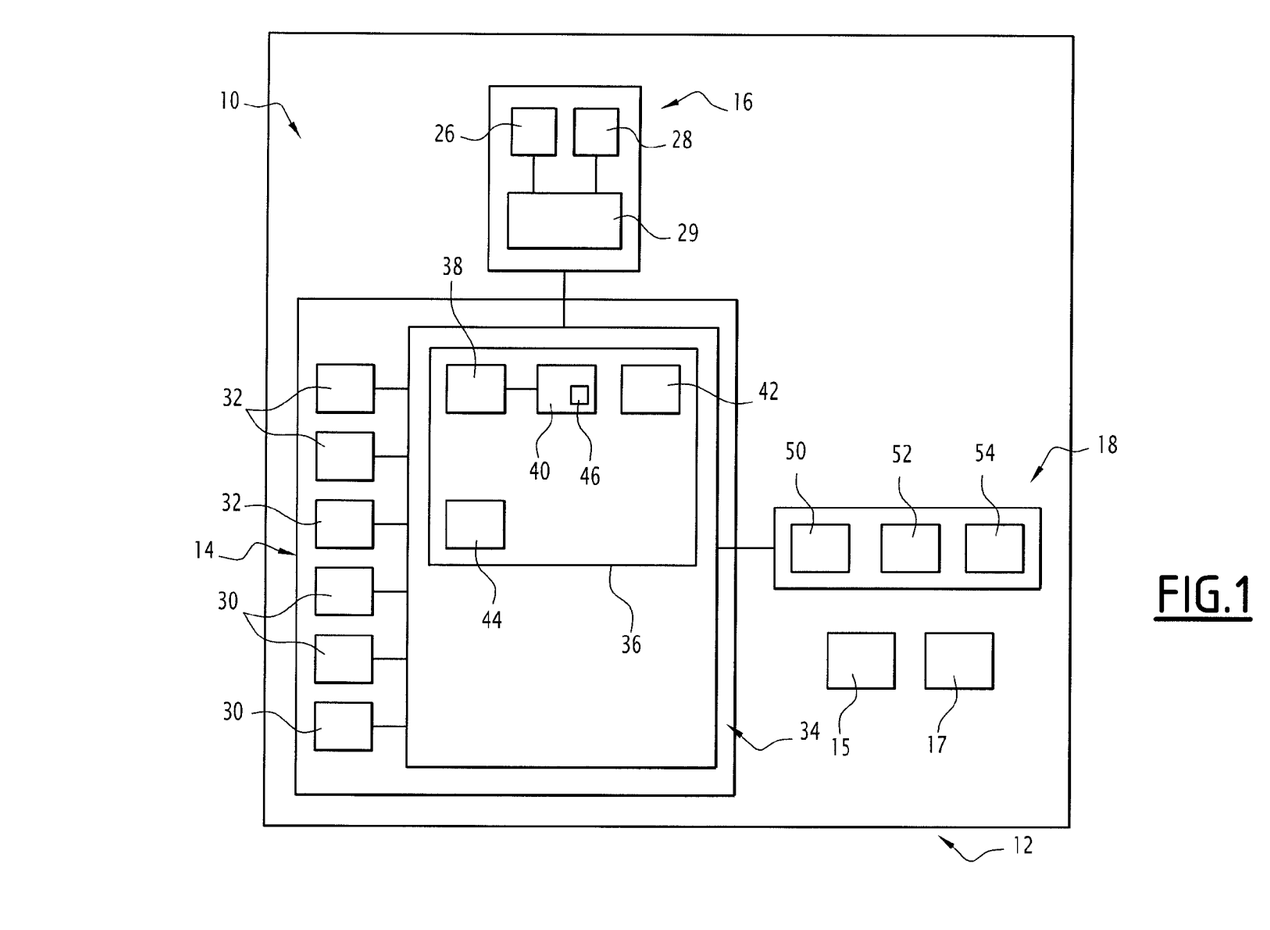
FIG. 1 is a view of a diagram diagrammatically illustrating a first detection system for implementing a method according to an embodiment of the invention.

A failure detection method according to an embodiment of the invention is implemented using a detection system 10, shown diagrammatically in FIG. 1.

The system 10 is positioned in a civilian or military aircraft 12, provided with an inertial unit 14, a flight data display system 15, connected to the inertial unit 14, and an automatic control and navigation system 17 of the aircraft.

As illustrated by FIG. 1, the system 10 includes the inertial unit 14, an assembly 16 for measuring a pressure altitude distinct from the altitude determined by the inertial unit 14, and, according to an embodiment of the invention, a failure detection element 18, connected to the inertial unit 14.

The measuring assembly 16 includes at least one sensor 26 for measuring a static pressure around the aircraft.

It includes an assembly 29 for processing data coming from a sensor 26, capable of computing at least one pressure altitude, independent of the altitude provided by the inertial unit 14.

In a known manner, the inertial unit 14 includes a plurality of sensors 30, 32 of metrological precision, and a computer 34 connected to the sensors 30, 32, capable of exploiting the data from the sensors 30, 32 to provide position, speed and attitude parameters usable by the pilot of the aircraft.

Among the sensors 30, 32, the inertial unit 14 in particular includes several rate gyros 30, for example three. The rate gyros 30 provide angular speed of rotation values around axes, in order each to determine a component of the angular speed vector (in particular pitch, roll, or yaw speed).

The inertial unit 14 further includes several accelerometers 32, for example three, providing representative acceleration values along the axes of the aircraft 12.

At least one accelerometer 32 is capable of measuring a value representative of a vertical acceleration AccZ of the aircraft, considered along a geographical vertical axis.

In general, the computer 34 of the inertial unit 14 is capable of determining, at successive moments t, at a given frequency for example comprised between 1 Hz and 100 Hz, numerical geographical position (latitude, longitude, altitude), geographical speed, and attitude data of the aircraft in heading, roll and pitch, from information provided by the accelerometers 32 and the rate gyros 30.

Among the functionalities of the computer 34, the latter includes a software assembly 36 for implementing a baro-inertial correction, capable of determining a long-term baro-inertial altitude ZBILT and a short-term baro-inertial altitude ZBICT, based on the vertical acceleration AccZ measured using the acceleration sensor 32, and a correction based on the pressure altitude Zp coming from the assembly 16.

The long-term baro-inertial altitude ZBILT and the short-term baro-inertial altitude ZBICT are information provided to the computers of the display system 15, and the computers of the automatic control and navigation system 17 of the aircraft.

Figure 4:
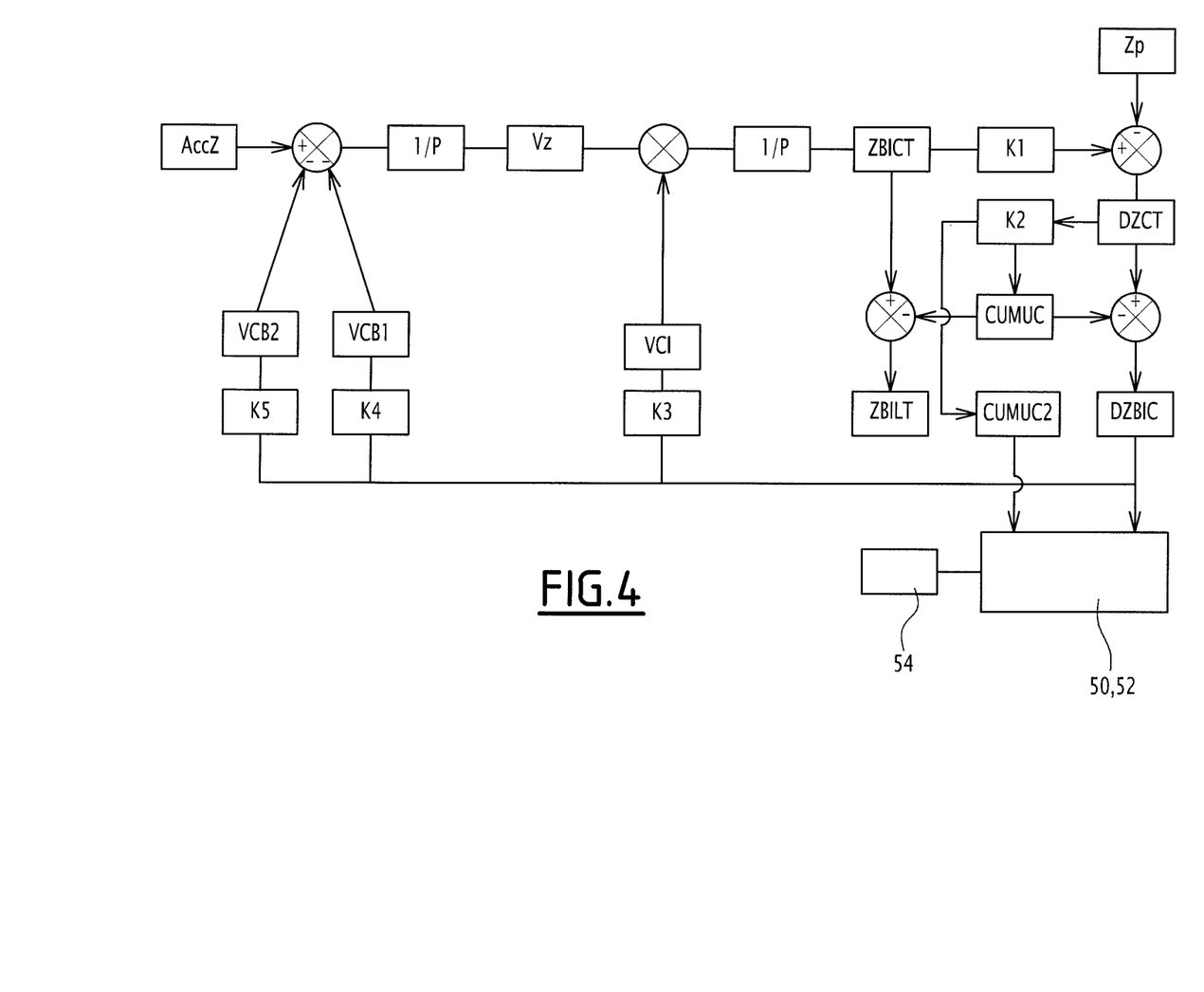
FIG. 4 is a diagram illustrating the failure detection principle implemented by the method according to an embodiment of the invention.

In reference to FIGS. 1 and 4, to implement the baro-inertial loop, the implementing software assembly 36 includes a software module 38 for obtaining a computed vertical speed Vz, then a short-term baro-inertial altitude ZBICT, based on a double integration of the vertical acceleration AccZ obtained from the acceleration sensor 32.

The assembly 36 further includes a software module 40 for developing at least one intermediate parameter DZCT, CUMUC, DZBIC based on a deviation between the short-term baro-inertial altitude ZBICT and the pressure altitude Zp.

It further includes a software module 42 for determining the long-term baro-inertial altitude ZBILT, based on at least one intermediate parameter CUMUC, and the short-term baro-inertial altitude ZBICT.

The assembly 36 also includes a software module 44 for correcting the measured vertical acceleration AccZ, before integration, and/or the vertical speed Vz computed after integration, based on the value of at least one intermediate parameter DZBIC and a plurality of variable gains K3 to K5, computed by a gain determination loop.

In this example, the module 40 is capable of computing, at each moment t, a first intermediate parameter made up of a difference DZCT between the time-compensated short-term baro-inertial altitude ZBICT and the pressure altitude Zp, then developing a second intermediate parameter CUMUC representative of the accumulation over time of the difference DZCT, based on a variable accumulation gain K2, computed by the gain determination loop.

To that end, the module 40 includes a variable gain K1 compensator 46, capable of processing the short-term baro-inertial altitude ZBICT obtained at each moment t by the module 38, to adjust it in terms of time and intensity with the pressure altitude Zp measured by the measuring assembly 16.

The module 40 is further capable of developing, at each moment t, a third intermediate parameter DZBIC, representative of a deviation between the short-term baro-inertial altitude ZBICT and the pressure altitude Zp, corrected using the second intermediate parameter CUMUC.

According to the embodiment of the invention, the failure detection element 18 includes a software assembly 50 for developing and observing at least one failure detection parameter CUMUC2, DZBIC, coming from at least one intermediate parameter DZCT, CUMUC, DZBIC computed in the baro-inertial loop by the implementing assembly 36.

The element 18 further includes a software assembly 52 for determining the presence of a failure on at least one of the sensors 32, 36 of the aircraft 12, based on the value of at least one observed failure detection parameter CUMUC2, DZBIC, and advantageously, an assembly 54 for activating an alarm when the failure is detected by the determination assembly 52.

A failure detection method according to an embodiment of the invention will now be described.

Figure 2:
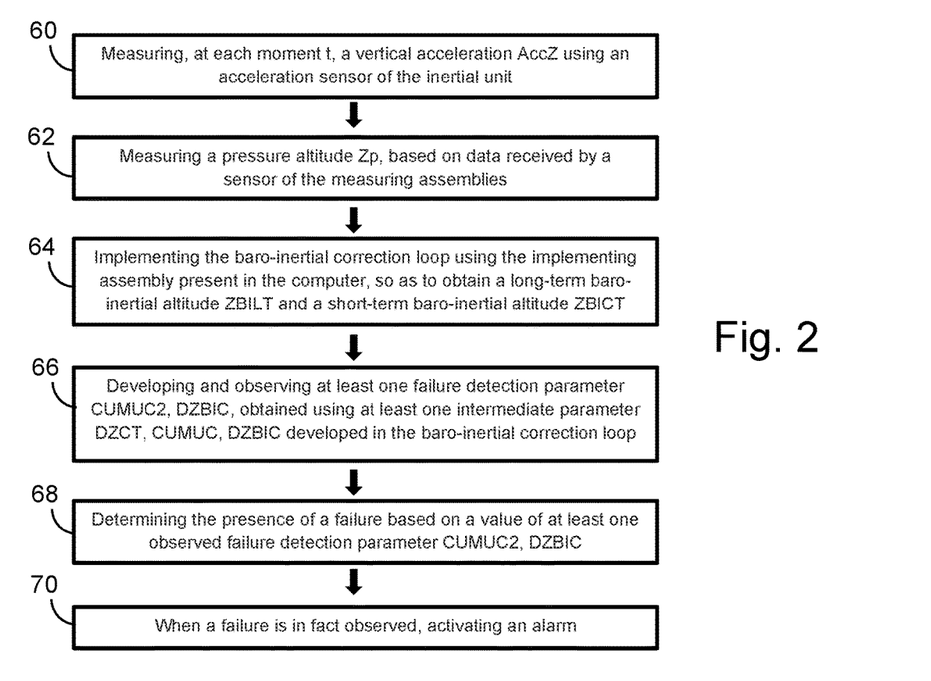
FIG. 2 is a functional block diagram of the steps of the method according to an embodiment of the invention.

As illustrated by FIGS. 2 and 4, this method includes a step 60 for measuring, at each moment t, a vertical acceleration AccZ using an acceleration sensor 32 of the inertial unit 14, and a step 62 for measuring a pressure altitude Zp, based on data received by a sensor 26 of the measuring assemblies 16, which here is for example a pressure sensor 26.

The method further includes a step 64 for implementing the baro-inertial correction loop using the implementing assembly 36 present in the computer 34, so as to obtain a long-term baro-inertial altitude ZBILT and a short-term baro-inertial altitude ZBICT provided to a computer of the display system 15 and a computer of the automatic control and navigation system 17 of the aircraft 12.

The method further includes a step 66 for developing and observing at least one failure detection parameter CUMUC2, DZBIC, obtained using at least one intermediate parameter DZCT, CUMUC, DZBIC developed in the baro-inertial correction loop and a step 68 for determining the presence of a failure based on a value of at least one observed failure detection parameter CUMUC2, DZBIC.

When a failure is in fact observed, the method advantageously includes a step 70 for activating an alarm.

In step 60, a vertical acceleration AccZ is measured by the vertical acceleration sensor 32 at successive moments t1, for example at a frequency comprised between 1 Hz and 100 Hz. This vertical acceleration AccZ is compensated for the Coriolis acceleration and gravity.

Likewise, in step 62, a pressure altitude Zp is developed by the assembly 29, at successive moments t2, for example a frequency comprised between 1 Hz and 100 Hz, from measurements from the sensors 26.

In the rest of this document, the sensor used to determine the pressure altitude is the pressure sensor 26.

Figure 3:
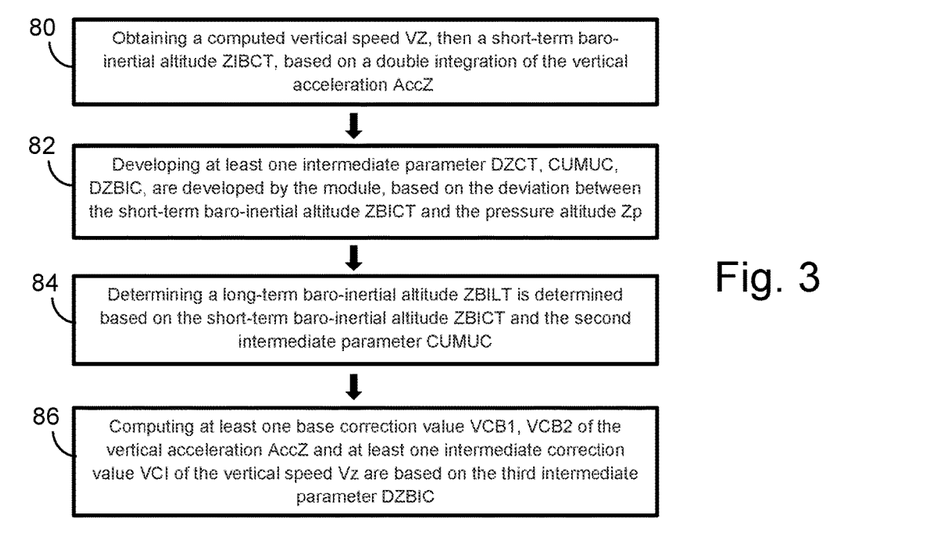
FIG. 3 is a functional block diagram of sub-steps of the baro-inertial correction loop implemented in the method according to an embodiment of the invention.

FIG. 3 illustrates the different sub-steps 80 to 86 of the step 66 for implementing the baro-inertial loop using the implementing assembly 36 of the computer 34. The different sub-steps 80 to 86 are repeated upon each iteration of the loop.

During the sub-step 80, and as illustrated in FIG. 4, a computed vertical speed VZ, then a short-term baro-inertial altitude ZIBCT, are obtained by the module 38 based on a double integration of the vertical acceleration AccZ measured in step 60 at each moment t1.

To that end, the measured acceleration AccZ is first corrected by at least one base correction value VCB1, VCB2 developed during a correction step 86 of the preceding iteration.

The corrected acceleration is next integrated to obtain a computed vertical speed VZ.

The computed vertical speed VZ is also corrected by at least one intermediate correction value VCI developed during a correction step 86 of a preceding iteration of the baro-inertial loop.

The corrected vertical speed is next integrated to obtain the short-term baro-inertial altitude ZBICT.

During step 82, and as illustrated in FIG. 4, at least one intermediate parameter, advantageously three intermediate parameters DZCT, CUMUC, DZBIC, are developed by the module 40, based on the deviation between the short-term baro-inertial altitude ZBICT and the pressure altitude Zp.

To that end, a first intermediate parameter, namely a temporally compensated difference DZCT, is computed based on the short-term baro-inertial altitude ZBICT, and the pressure altitude Zp.

A temporal compensator 46 implemented in the software module 40 is used to readjust the computed value of the short-term baro-inertial altitude ZBICT resulting from the measurement of the vertical acceleration AccZ at a moment t1, with a pressure altitude Zp resulting from the measurement done by the sensor 26 at the same moment t1.

This compensation makes it possible to correct any offset between the time needed to perform the double integration of the vertical acceleration AccZ obtained from the measurement from the sensor 32 and the time necessary to develop the pressure altitude Zp from the measurement by the sensor 26.

Furthermore, a variable compensation gain K1 is applied to the short-term baro-inertial altitude ZBICT to create the temporally compensated short-term baro-inertial altitude.

The difference DZCT between the temporally compensated short-term baro-inertial altitude and the pressure altitude Zp is next determined.

Then, the second intermediate parameter CUMUC is determined. As will be seen below, the second intermediate parameter CUMUC here is representative of the weighted accumulation of the successive differences DZCT between the temporally compensated short-term baro-inertial altitude ZBICT and the pressure altitude Zp.

For the weighting, a variable accumulation gain K2 is applied to each difference DZCT to obtain a weighted difference.

The weighted difference is added to the accumulation of the weighted differences obtained during the preceding iterations, to obtain the second intermediate parameter CUMUC. This constitutes an integration.

The second intermediate parameter CUMUC is thus representative of the accumulation of the deviations between the measured atmosphere and the standard atmosphere. These deviations are on the one hand representative of the natural deviation between the atmosphere on the day and the standard atmosphere, and on the other hand are representative of measurement anomalies of the atmosphere of the day.

The third intermediate parameter DZBIC is computed from the difference DZCT and the second intermediate parameter CUMUC.

In particular, DZBIC is equal to the difference DZCT–CUMUC.

During the sub-step 84, a long-term baro-inertial altitude ZBILT is determined based on the short-term baro-inertial altitude ZBICT and the second intermediate parameter CUMUC.

In particular, ZBILT is equal to the difference ZBICT–CUMUC.

Then, during the correction sub-step 86, at least one base correction value VCB1, VCB2 of the vertical acceleration AccZ and at least one intermediate correction value VCI of the vertical speed Vz are computed based on the third intermediate parameter DZBIC.

In the example shown in FIG. 4, an intermediate variable correction gain K3 is applied to the third intermediate parameter DZBIC to constitute the intermediate correction value VCI applied to the vertical speed VZ obtained after integration.

In particular, VCI is equal to the product K3×DZBIC, and the corrected VZ is equal to the difference VZ–VCI.

Furthermore, a first base variable correction gain K4 is applied to the third intermediate parameter DZBIC to constitute a first intermediate correction value VCB1 applied to the vertical acceleration AccZ before integration.

In particular, VCB1 is equal to the product K4×DZBIC.

Furthermore, a second base correction variable gain K5 is applied to the third intermediate parameter DZBIC. The obtained value is next integrated to constitute a second intermediate correction value VCB2 applied to the vertical acceleration AccZ before integration of the acceleration.

In particular, VCB2 is equal to the integrated value of K5×DZBIC and the corrected AccZ is equal to AccZ–VCB1–VCB2.

Figure 5:
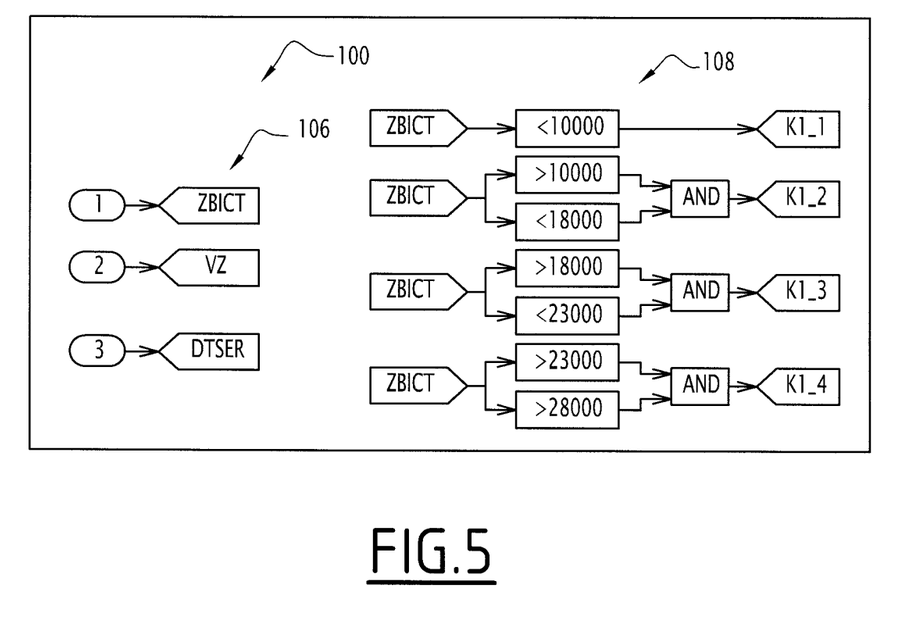
FIGS. 5 to 8 illustrate an example of a loop for computing variable gains implemented in the method according to an embodiment of the invention.
Figure 6:
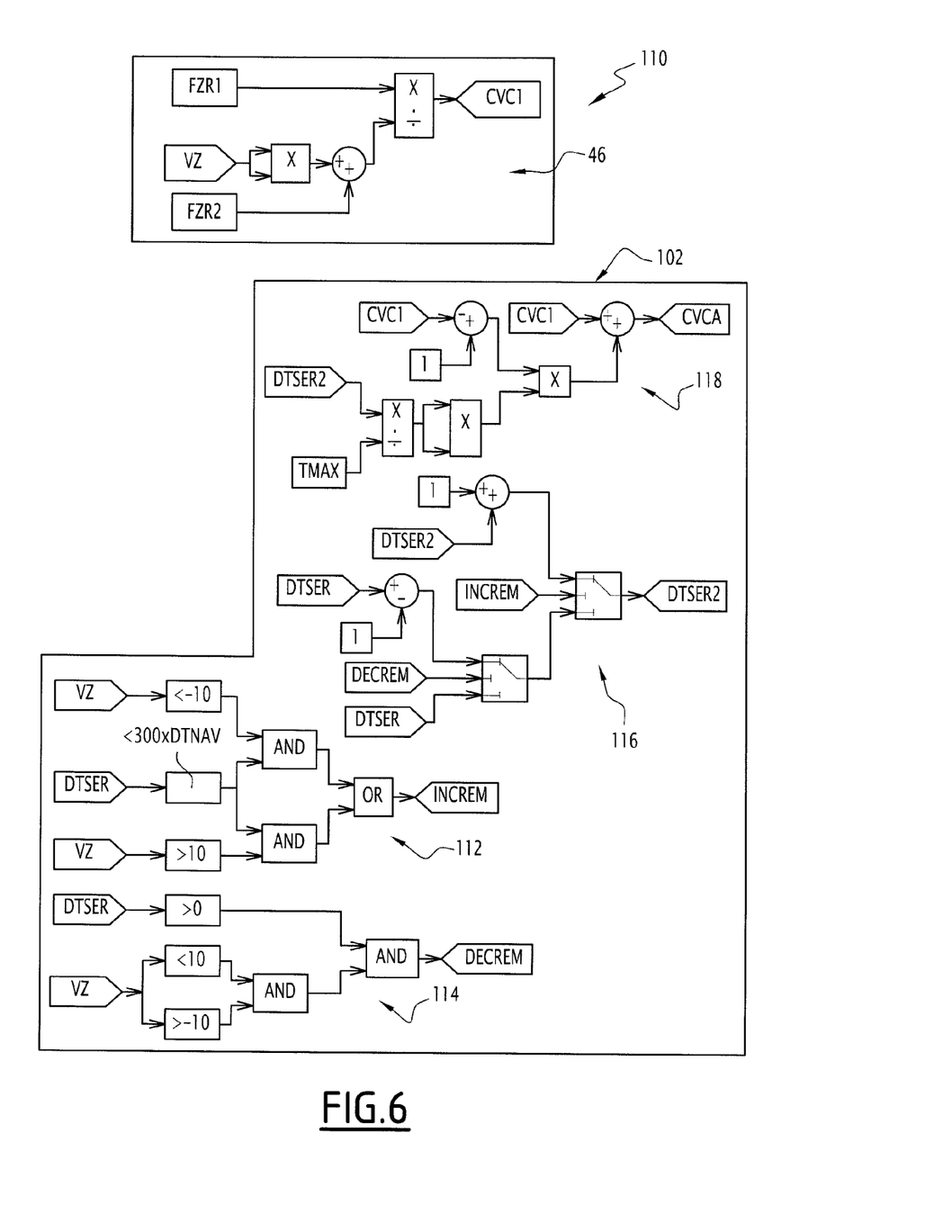
Figure 7:
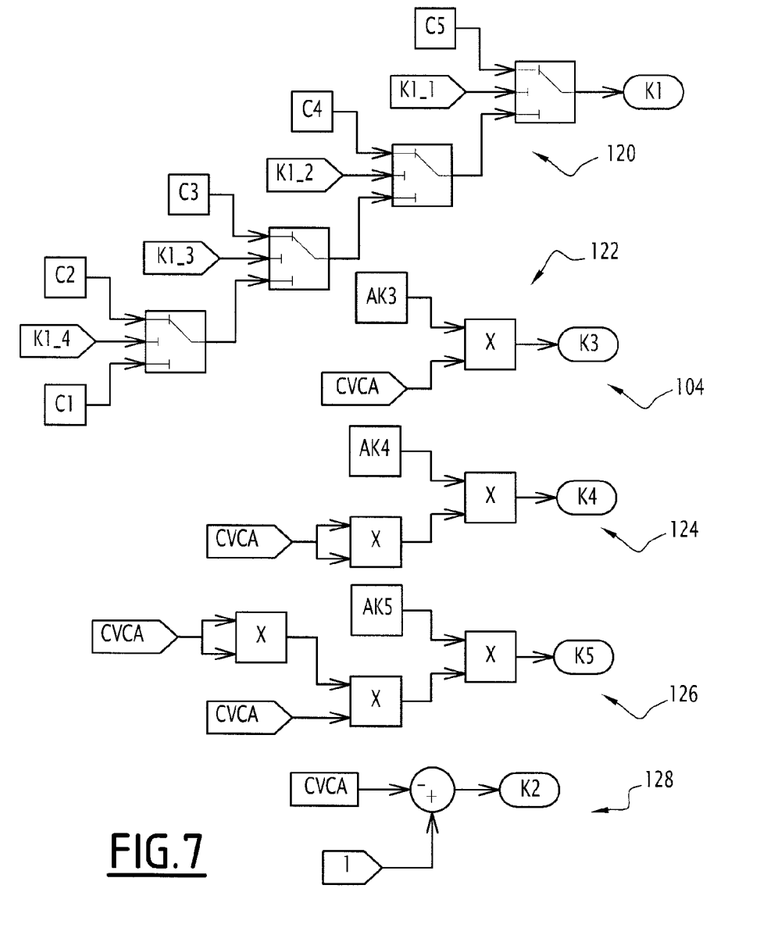

The variable gains K1 to K5 are computed by a gain determination loop, implemented in the assembly 36, and for example shown in FIGS. 5 to 7.

The gain determination loop includes, for each iteration, an initialization phase 100 shown in FIG. 5, a phase 102 for computing intermediate values CVC1, DTSER2, CVCA, illustrated by FIG. 6, and a phase 104 for computing variable gains K1 to K5, based on intermediate variables CVC1, DTSER2, CVCA, illustrated by FIG. 7.

During the initialization phase 100, the short-term baro-inertial altitude ZBICT and the vertical speed Vz obtained during sub-step 80 are reported (diagram 106).

A starting variable DTSER is initialized from an intermediate variable DTSER2 obtained during a preceding iteration, by integration of that intermediate variable DTSER2.

Based on the value ZBICT, and predetermined logic conditions, a series of switches K1_1 to K1_4 are initialized, as illustrated in diagram 108.

For example, if ZBICT is below a predetermined value, for example 10,000, the switch K1_1 is activated.

During the phase 102, a first intermediate variable CVC1 is computed from VZ, and from several constants FVZR1 and FVZR2, as illustrated in the diagram 110.

In this example, the square of VZ is computed, then is added to a constant FVZR2. The other constant FVZR1 is divided by the sum obtained, to yield the first intermediate variable CVC1.

Then, a second intermediate variable DTSER2 is computed from VZ, DTSER and constants, which here are all equal to 1.

Based on the values of VZ and DTSER, and by comparing those values to predefined thresholds, an increment INCREM or decrement DECREM is computed according to diagrams 112 and 114.

The value of a second intermediate variable DTSER2 is next computed according to diagram 116, based on DTSER and the increment INCREM or decrement DECREM optionally computed according to diagrams 112 and 114.

In particular, depending on the values of DECREM and INCREM (for example >0.5 or <0.5), DTSER2 is equivalent to DTSER, DTSER+1 or DTSER−1.

Then, a third intermediate variable CVCA is computed from the first intermediate variable CVC1, the second intermediate variable DTSER2, and constants, as illustrated by diagram 118.

In one example, DTSER2 is divided by a constant TMAX, the result then being multiplied by itself to form a product. The first intermediate variable CVC1 is subtracted from another constant, here equal to 1, the result being multiplied by the preceding product, before being added to the first intermediate variable CVC1 to obtain the third intermediate variable CVCA.

During the phase 104, the value of the compensation variable gain K1 is computed in the diagram 120, based on the values of switches K1_1 to K1_4 determined during the initialization phase 108 and constants C1 to C5.

The values of the constants are for example following:
C1=2.46202856
C2=3.67428159
C3=5.0014233
C4=6.7145272
C5=5.8222268

For each of the boxes driven by the switches K1_1 to K1_4 in diagram 120 of FIG. 7, when the value of the switch is above a given constant, for example equal to 0.5, the output is equivalent to the value of the constant situated at the upper input, whereas otherwise, the output is equivalent to the value of the constant situated at the lower input.

The value of the variable gains K2 to K5 is also determined based on the third intermediate variable CVCA and specific constants, according to diagrams 122 to 128.

Figure 8:
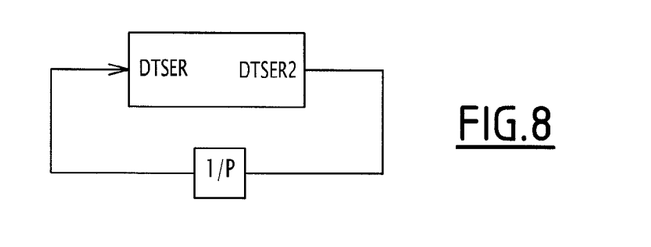

Furthermore, the second intermediate variable DTSER2 is integrated using a loop shown in FIG. 8 to obtain a value of the initial starting variable DTSER1 to be used during a subsequent iteration of the loop.

In the development and observation steps 68, at least one failure detection parameter CUMUC2, DZBIC is developed and observed by a development and observation assembly 50.

In the example shown in FIG. 4, a first failure detection parameter CUMUC2 is obtained similarly to the second intermediate parameter CUMUC by accumulating information representative of the deviations between the measured atmosphere and the standard atmosphere.

To limit the measuring anomalies that for example result from an accumulation of atmosphere deviations or small measuring errors during altitude variations (phases during which the control gain K2 of the second intermediate parameter CUMUC is high), or which result from the accumulation of the same source of error during small, but numerous low-amplitude altitude variations during leveling off, the first failure detection parameter CUMUC2 is designed to decrease when the flight is stable and when no anomaly has been detected.

In one example, the value of the failure detection parameter CUMUC2 is computed similarly to that of the second intermediate parameter CUMUC, by successively accumulating the values of the difference DZCT between the temporally compensated short-term baro-inertial altitude ZBICT and the pressure altitude Zp.

However, unlike the second intermediate parameter CUMUC, the first failure detection parameter CUMUC2 is decreased, and is advantageously reset to zero when at least one absence of anomaly detection condition is obtained for a predetermined time interval T.

For example, the first failure detection parameter CUMUC2 is reset to zero once the variable accumulation gain K2 is below a given predetermined value for a given amount of time.

In one particular example, when the variable accumulation gain K2 is less than 0.1 for 20 seconds, the value of the first failure detection parameter CUMUC2 is reset at zero.

Furthermore, a second failure detection parameter DZBIC is also developed and observed by the assembly 50.

In the example shown in FIG. 4, the second failure detection parameter DZBIC is equal to the third intermediate parameter DZBIC.

This parameter is representative of the coherence between the inertial measurements obtained from the sensor 32 and the outside measurements, in particular barometric, obtained from a sensor 26 during the level flight phases. During these flight phases, the altitude is substantially stable.

In one example, the value of the variable accumulation gain K2 is compared with a predetermined threshold. A level flight phase is defined when the value of the variable gain of the accumulation K2 is below the predetermined threshold value. On the contrary, an ascending or descending flight phase is defined when the value of the variable accumulation gain K2 is above the predetermined threshold value.

Next, during step 68, a failure detection is done based on the failure detection parameter CUMUC2 observed in step 66.

In one particular embodiment, the failure detection parameter CUMUC2 is compared to a first given predetermined threshold.

When the value of the failure detection parameter CUMUC2 is below the predetermined threshold value associated with that parameter, no failure is detected.

When the value of the failure detection parameter CUMUC2 is above the predetermined threshold value associated with that parameter, a failure is detected.

Simultaneously, the failure detection parameter DZBIC is compared to a second given predetermined threshold.

When the value of the failure detection parameter DZBIC is below the predetermined threshold value associated with that parameter, no failure is detected.

When the value of the failure detection parameter DZBIC is above the value of the predetermined threshold associated with that parameter, a failure is detected.

When a failure is detected on at least one of the failure detection parameters CUMUC2, DZBIC, an alarm is activated in step 70. This alarm is connected to a vertical path sensor, although it does not target one sensor in particular. However, the pilot is asked to verify the base parameters, by comparison with an independent instrument or by observation of the environment.

In one advantageous alternative, to avoid false alarms, filtering and/or hysteresis are applied to each of the failure detection parameters CUMUC2, DZBIC to avoid triggering an untimely alarm.

The failure detection parameters CUMUC2, DZBIC are observed simultaneously. However, these parameters are complementary, since they make it possible to detect anomalies during an altitude variation phase or during a level flight phase, respectively.

In another alternative, the value of the failure detection parameter CUMUC2 is decreased, advantageously reset to zero based on the evolution of the vertical speed or another parameter representative of the vertical evolutions of the aircraft.

In still another alternative, the vertical acceleration AccZ sensor 32 of the system 10 is independent of the inertial unit 14, the system 10 not comprising the inertial unit 14 in that case, but simply a computer 34 similar to that described above.

In another alternative, at least one failure detection parameter is obtained from the second intermediate parameter CUMUC.

In another alternative, the pressure altitude Zp is measured by a laser sensor, such as a laser anemometric sensor. The method according to the embodiment of the invention is implemented in a manner similar to that which was described above.

Figure 9:
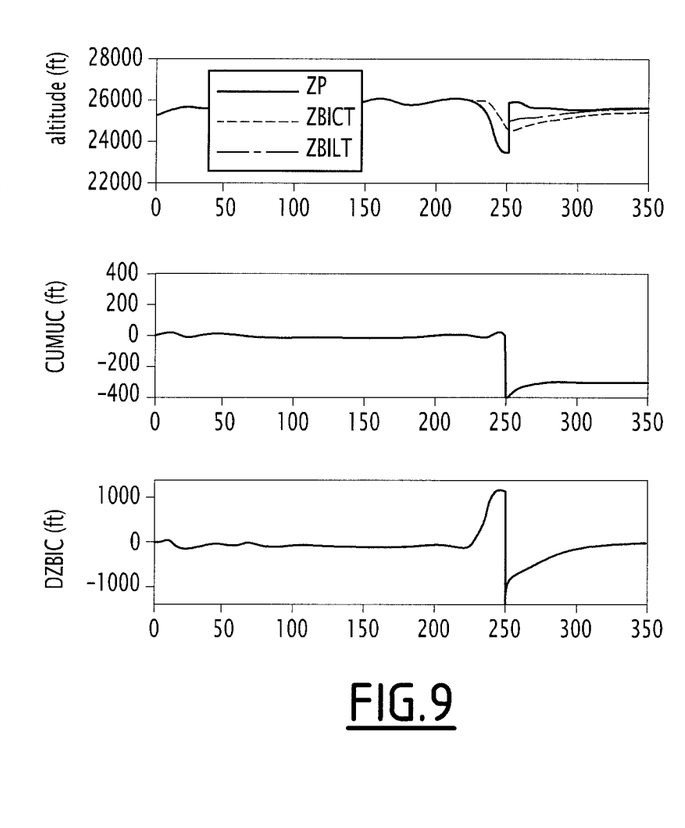
FIG. 9 shows graphs of the altitude, and of failure detection parameters computed in the method according to an embodiment of the invention, during a static pressure disruption after leveling off.

One example embodiment of the method according to the invention during a level flight phase is illustrated by FIG. 9.

During that phase, and for proximally 250 seconds, the static pressure measurement sensor 26 works correctly.

Each of the failure detection parameters CUMUC2, DZBIC has a substantially zero value. No failure is detected.

Around 250 seconds, the static pressure sensor 26 undergoes a malfunction that immediately results in erroneous signals regarding the short-term baro-inertial altitude ZBICT and the long-term baro-inertial altitude ZBILT.

As illustrated on the curve at the bottom of FIG. 9, the value of the second failure detection parameter DZBIC increases and crosses the detection threshold. The failure is detected quasi-immediately.

Figure 10:
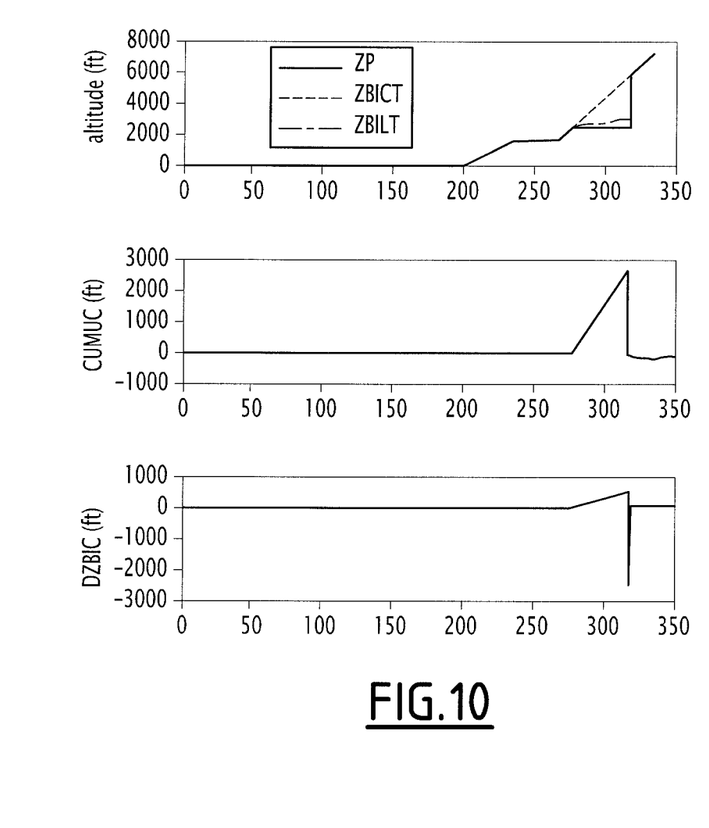
FIG. 10 is a view similar to FIG. 9, for static pressure blocking during ascent.

In the example of FIG. 10, the aircraft 12 has an altitude variation phase beginning at the time equal to 200 seconds. Until the time equal to 275 seconds, the static pressure sensor 26 works normally. The value of each failure detection parameter CUMUC2, DZBIC is substantially zero. No failure is detected.

From the time equal to 275 seconds, plugging occurs on the static pressure sensor 26. This plugging immediately disrupts the short-term baro-inertial altitude ZBICT and the long-term baro-inertial altitude ZBILT.

As illustrated by the curve in the middle of FIG. 10, the value of the first failure detection parameter CUMUC2 increases immediately and crosses the detection threshold. The failure is detected quasi-immediately.

The detection system 10 according to the embodiment of the invention, and the method implemented using the system 10, therefore allow very quick and reliable detection of the failure occurring on the vertical path of the aircraft, for example at a static pressure sensor, or a vertical accelerometer.

The method is particularly simple to implement, since it advantageously uses intermediate parameters DZCT, CUMUC, DZBIC present in the baro-inertial loop, which surprisingly allow the detection of failures.

Unlike the long-term baro-inertial altitude ZBILT or the short-term baro-inertial altitude ZBICT obtained at the output of the loop, none of the intermediate parameters DZCT, CUMUC, DZBIC of the baro-inertial loop used to develop the failure detection parameters CUMUC2, DZBIC are normally sent to the computers of the display systems 17 or the control systems 19 of the aircraft 12.

The embodiment of the invention described above shows that surprisingly, these intermediate parameters are a very useful basis for creating failure detection parameters that detect a failure on a vertical path sensor precisely and quasi-immediately.

What is claimed is:

1. A method for detecting a failure of at least one sensor on board an aircraft comprising:
    measuring a vertical acceleration;
    measuring a pressure altitude;
    implementing a baro-inertial loop in a computer, the loop including:
        obtaining a computed vertical speed, then a short-term baro-inertial altitude, based on a double integration of the measured vertical acceleration;
        developing at least one intermediate loop parameter based on a deviation between the short-term baro-inertial altitude and the pressure altitude; and
        looping on the measured vertical acceleration before integration and/or on the vertical speed computed after integration, based on the value of at least one intermediate parameter;
    observing at least one failure detection parameter obtained from the at least one intermediate parameter of the baro-inertial loop;
    determining the presence of a failure on the at least one sensor of the aircraft based on a value of the observed failure detection parameter.

2. The method as recited in claim 1 wherein the determining the presence of a failure on the at least one sensor includes comparing the value of the observed failure detection parameter and a given predetermined threshold.

3. The method as recited in claim 1 wherein the baro-inertial loop includes computing a first intermediate parameter representative of the difference between the short-term baro-inertial altitude and the pressure altitude, and computing a second intermediate parameter representative of the accumulation of a deviation between the short-term baro-inertial altitude and the pressure altitude over several iterations of the loop.

4. The method as recited in claim 3 wherein the baro-inertial loop includes the determination of an accumulation gain of each deviation between the short-term baro-inertial altitude and the pressure altitude, the second intermediate parameter being computed based on the accumulation gain.

5. The method as recited in claim 4 wherein the accumulation gain is a variable gain, the accumulation gain being computed based on the short-term baro-inertial altitude and/or a vertical speed obtained by integrating the measured vertical acceleration.

6. The method as recited in claim 3 wherein a first failure detection parameter is determined from an accumulation of a deviation between the short-term baro-inertial altitude and the pressure altitude over several iterations of the loop, the determination of the first failure detection parameter comprising a decrease in the accumulation, when at least one condition for lack of anomaly detection is obtained for a given time interval.

7. The method as recited in claim 6 wherein the loop includes determining an accumulation gain of each deviation between the short-term baro-inertial altitude and the pressure altitude, the second intermediate parameter being computed based on the accumulation gain, and the lack of anomaly detection condition being obtained when the accumulation gain is below a given threshold for a predetermined time interval.

8. The method as recited in recited in claim 3 wherein the baro-inertial loop includes determining a third intermediate parameter, the third intermediate parameter being representative of a deviation between the short-term baro-inertial altitude and the pressure altitude corrected with the second intermediate parameter.

9. The method as recited in recited in claim 8 wherein a second failure detection parameter is determined from the third intermediate parameter.

10. The method as recited in recited in claim 9 wherein a first failure detection parameter is determined from an accumulation of a deviation between the short-term baro-inertial altitude and the pressure altitude over several iterations of the loop, the determining the first failure detection parameter comprising a decrease in the accumulation, when at least one condition for lack of anomaly detection is obtained for a given time interval and including a simultaneous observation of the first failure detection parameter and the second failure detection parameter, and the detection of the presence of a failure on one of the sensors of the aircraft, based on the value of at least one of the observed failure detection parameters.

11. The method as recited in claim 9 wherein the looping step comprises a sub-step for correcting the vertical acceleration before integration, by at least one base correction value depending on the third intermediate parameter and at least one base correction gain variable over time, to obtain the computed vertical speed after integration, the loop comprising a sub-step for correcting the vertical speed computed by at least one second intermediate correction value depending on the third intermediate parameter and at least one intermediate correction gain that is variable over time, to obtain the short-term baro-inertial altitude after integration.

12. The method as recited in claim 1 wherein the baro-inertial loop includes time compensating the short-term baro-inertial altitude obtained after integration, the intermediate parameter representative of a deviation between the short-term baro-inertial altitude and the pressure altitude being obtained from the difference between the time-compensated short-term baro-inertial altitude, and the pressure altitude.

13. The method as recited in claim 1 further comprising activating an alarm when the presence of a failure is detected in the step for determining the presence of a failure.

14. A system for detecting a failure of least one sensor on board an aircraft, comprising:
    a first measurement assembly configured to measure a vertical acceleration;
    a second measurement assembly configured to measure a pressure altitude;
    a computer including an implementation assembly configured to implement the baro-inertial loop, the implementation assembly comprising:
        a computation module configured to obtain a computed vertical speed, then a short-term baro-inertial altitude, based on a double integration of the vertical acceleration obtained from the first measurement assembly;
        a development module configured to develop at least one intermediate loop parameter based on a deviation between the short-term baro-inertial altitude and the pressure altitude obtained from the assembly for measuring a pressure altitude; and
        a looping module configured to loop on the measured vertical acceleration, before integration, and/or on the vertical acceleration computed after integration, based on the value of at least one intermediate parameter;
    an observation assembly configured to observe at least one failure detection parameter obtained from at least one of the intermediate parameters of the baro-inertial loop; and
    a determination assembly configured to determine the presence of a failure on one of the sensors of the aircraft based on the value of the observed failure detection parameter.

* * * * *